No. 867,354. PATENTED OCT. 1, 1907.
C. A. DOUGLASS & F. L. JONES.
AUTOMATIC WEIGHING MACHINE.
APPLICATION FILED APR. 15, 1907.

4 SHEETS—SHEET 1.

Witnesses:
G. Sargent Elliott
Adella M. Towle

Inventors
Clinton A. Douglass
Fred L. Jones.
By H. S. Bailey, Attorney

No. 867,354. PATENTED OCT. 1, 1907.
C. A. DOUGLASS & F. L. JONES.
AUTOMATIC WEIGHING MACHINE.
APPLICATION FILED APR. 15, 1907.

4 SHEETS—SHEET 2.

Witnesses:
G. Sargent Elliott.
Adella M. Towle

Inventors
Clinton A. Douglass
Fred L. Jones
By H. S. Bailey Attorney.

No. 867,354. PATENTED OCT. 1, 1907.
C. A. DOUGLASS & F. L. JONES.
AUTOMATIC WEIGHING MACHINE.
APPLICATION FILED APR. 15, 1907.
4 SHEETS—SHEET 3.
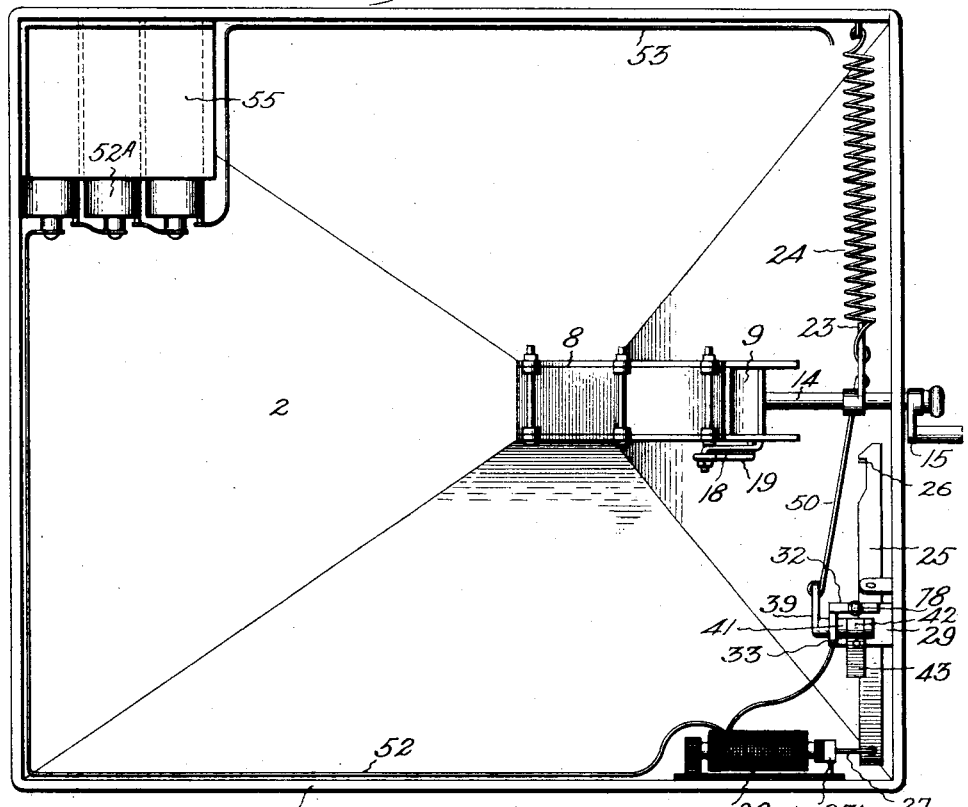
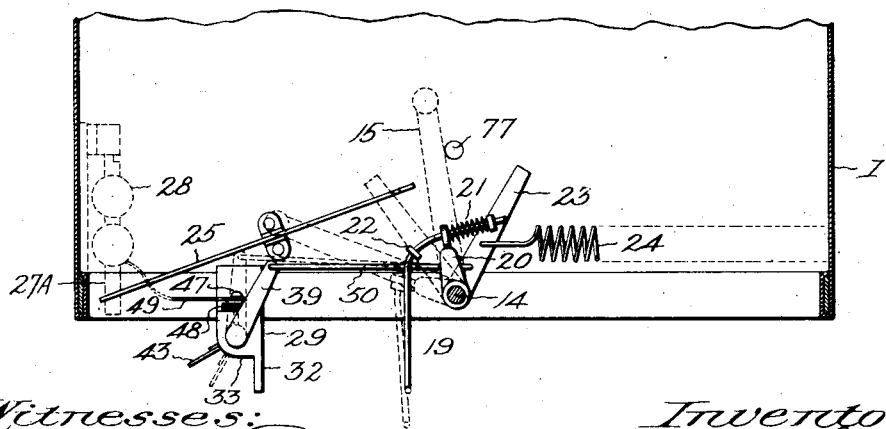

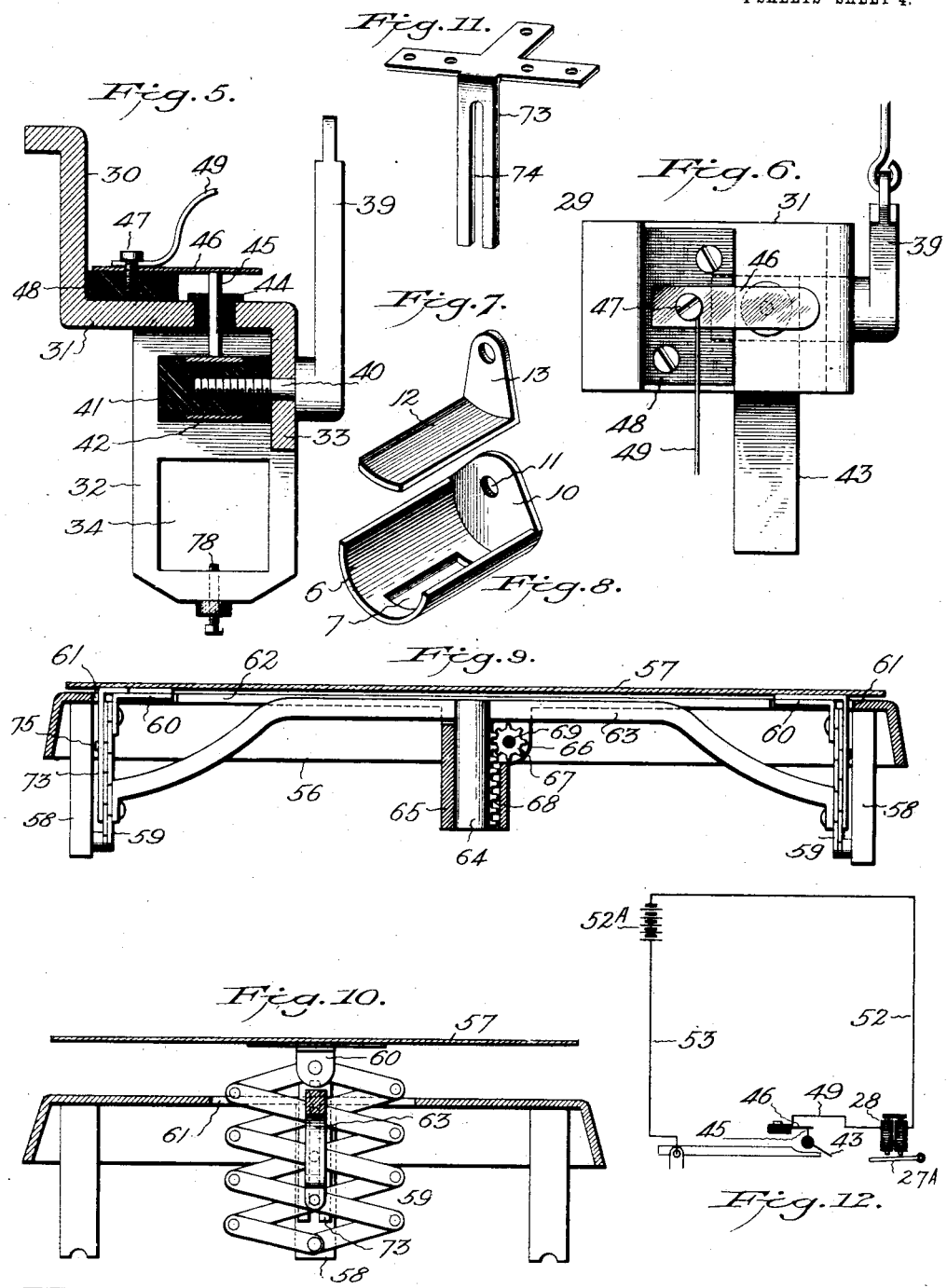

UNITED STATES PATENT OFFICE.

CLINTON A. DOUGLASS AND FRED L. JONES, OF DENVER, COLORADO.

AUTOMATIC WEIGHING-MACHINE.

No. 867,354.   Specification of Letters Patent.   Patented Oct. 1, 1907.

Application filed April 15, 1907. Serial No. 368,296.

*To all whom it may concern:*

Be it known that we, CLINTON A. DOUGLASS and FRED L. JONES, citizens of the United States of America, residing at the city and county of Denver and State of Colorado, have invented a new and useful Automatic Weighing-Machine, of which the following is a specification.

This invention relates to improvements in automatic weighing machines.

Figure 1:
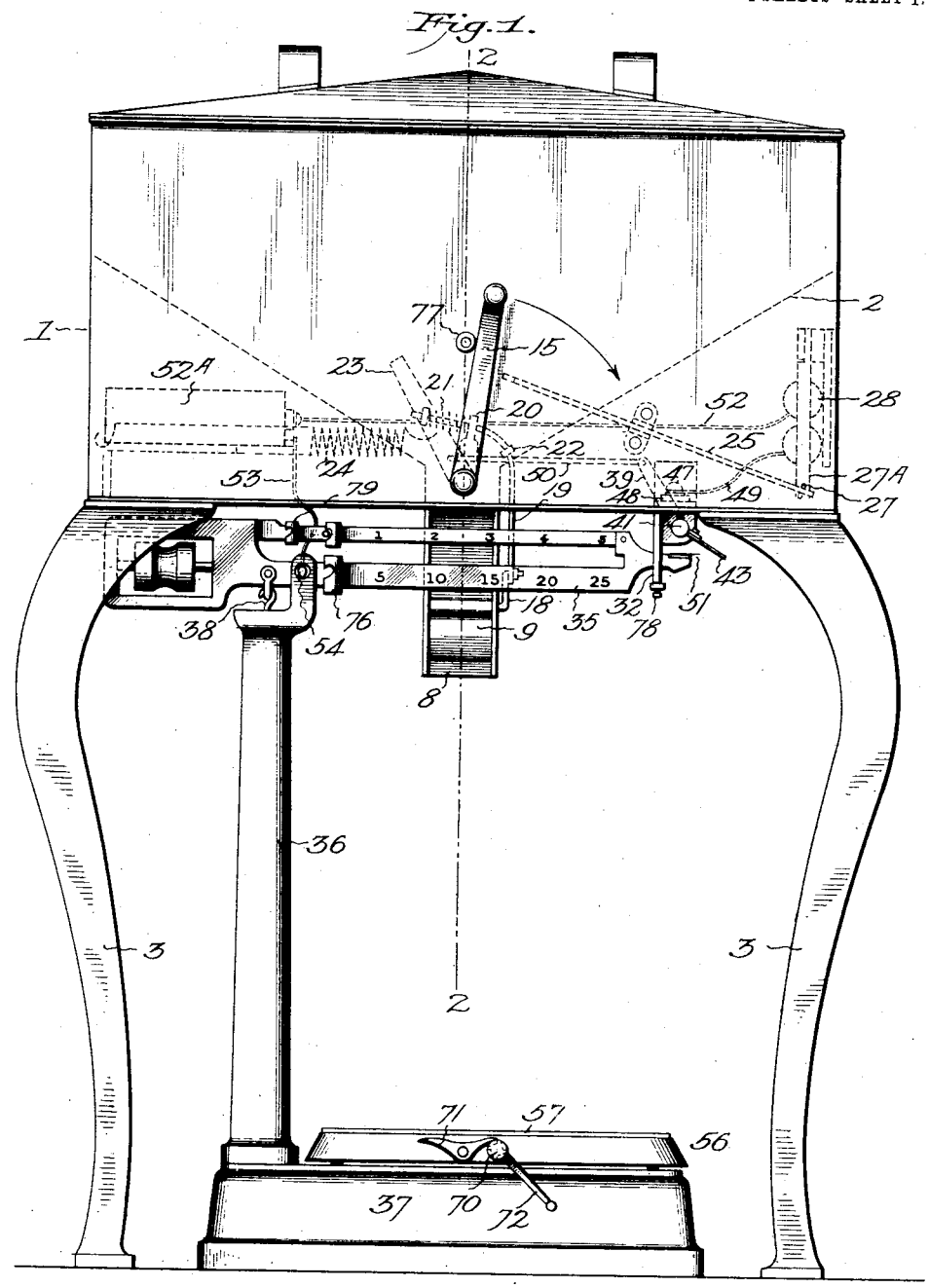
Figure 2:
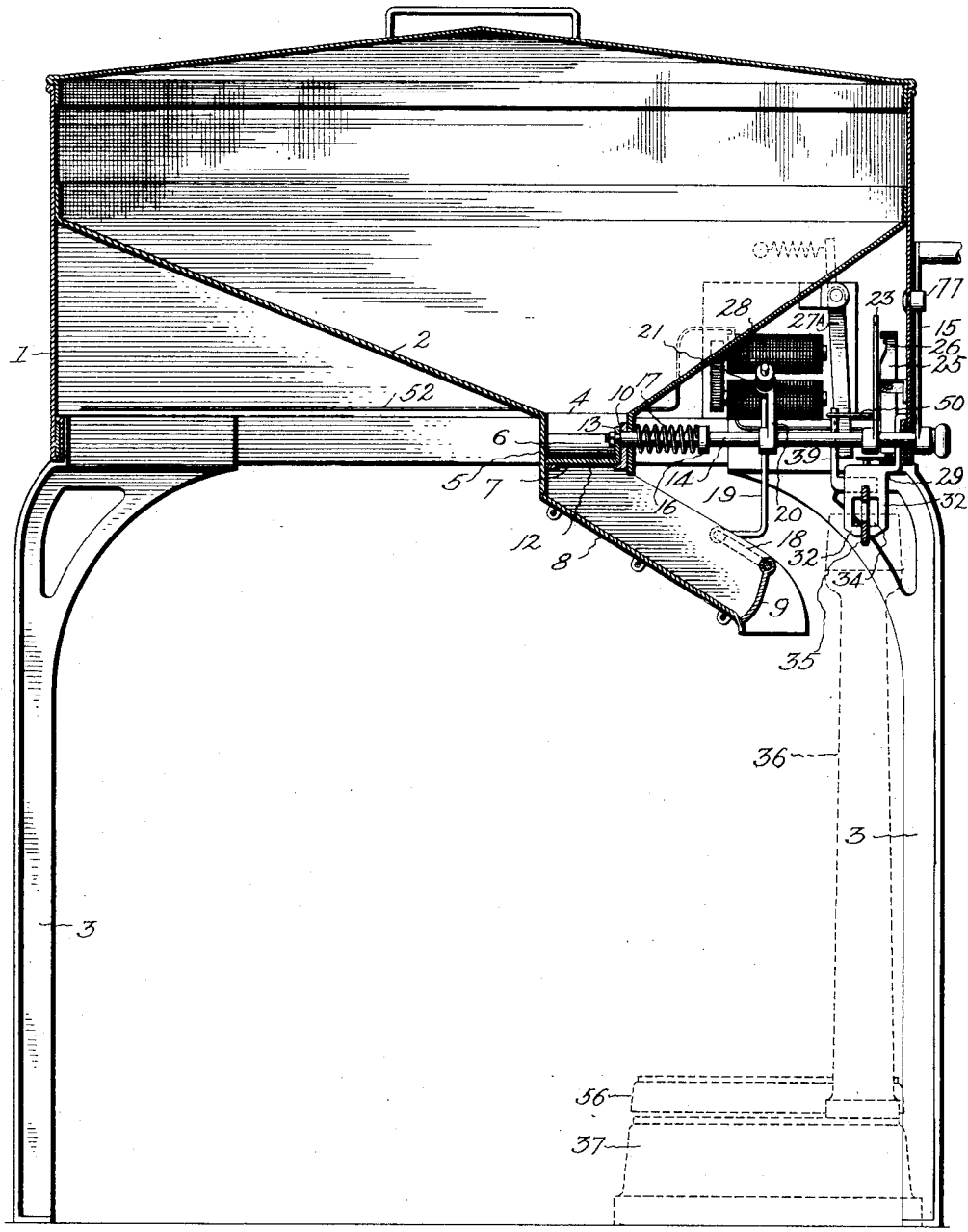

The object of the invention is to provide a weighing machine comprising a scale, a bin, and electrically-operated mechanism connected with the scale and bin for instantaneously cutting off the supply from the bin when the required weight has been discharged therefrom. Further, to provide a machine for accurately weighing all commodities of a dry, granular, nature, and which is arranged to instantly cut off the supply to the scale through the medium of a spring-controlled gate, which is held open by a latch during the discharge from the bin, which latch is tripped by the forming of an electric circuit, when the scale beam tips at the required weight, the machine being so arranged that the circuit is open at all times when the discharge opening of the bin is closed, so the scale may be used for weighing other commodities and articles, and thus serve for general weighing purposes, the scale platform being vertically adjustable relatively to the discharge chute, to properly position sacks of varying sizes beneath the same. These objects are attained by the mechanism illustrated in the accompanying drawings, in which:

Figure 1, is a front elevation of the improved weighing machine. Fig. 2, is a vertical, longitudinal, sectional view of the same on the line 2—2 of Fig. 1. Fig. 3, is a bottom or underside view thereof, apart from the scale, the supporting legs being omitted. Fig. 4, is an elevation of a portion of the front of the hopper frame, looking at the inner side thereof, and showing the mechanism secured thereto. Fig. 5, is a sectional view through the bracket which supports the circuit cutout arm. Fig. 6, is a plan view of the same. Fig. 7, is a perspective view of the valve which controls the opening in the bottom of the hopper. Fig. 8, is a perspective view of the casting at the bottom of the hopper, having the discharge opening which is normally closed by the valve. Fig. 9, is a vertical, longitudinal sectional view through the main and auxiliary platforms of the scale, showing the manner of supporting and elevating the latter. Fig. 10, is a transverse, sectional view of the same, showing the auxiliary platform partially raised. Fig. 11, is a perspective view of one of the slotted arms secured to the ends of the auxiliary platform, and which steady the upward movement of the same. And Fig. 12, is a diagram illustrating the electric circuit which is closed by the tipping of the scale beam, thereby to release the latch and close the cutoff gate.

Referring to the accompanying drawings, the numeral 1, indicates a rectangular frame or casing which forms the sides of a hopper 2, and which is supported upon legs 3. The hopper may be of any required size, and its bottom converges from all four sides to a rectangular aperture 4, which is preferably centrally located relatively to the width of the hopper, but forward of the center relatively to the length of the hopper. From this aperture the metal of the hopper bottom depends slightly to form a short neck 5, in which is secured a semi-circular bottom plate 6, having a discharge aperture 7, and below this plate is a forwardly and downwardly extending chute 8, the sides of which, at the upper end thereof, are rigidly secured to the neck 5. Across the lower end of the chute and between its sides, is hinged a gate 9, the lower end of which contacts with the bottom of the chute at a point where it terminates in a vertical bend, and the gate is normally held in this position so as to close the lower end of the chute by a spring to be presently described. The semi-circular plate 6, has a vertical wall 10, at its front end, having an aperture 11, registering with a corresponding aperture in the neck, and a cutoff or valve 12 in the form of a semi-circular plate, rests upon the plate 6, and normally closes its aperture 7. This cut-off has a vertical end member 13, with an aperture in line with the aperture in the bottom plate and neck, and a rod 14 extends through the front end of the casing, passing through the neck and bottom plate 6, the inner end of which rod is reduced and threaded and upon this threaded end is secured the cut-off 12. The outer end of the rod 14, is provided with an operating lever or handle 15, by which the rod is turned to operate the cut-off, and open the discharge aperture 7. A collar 16 is secured upon the rod adjacent to the neck of the hopper, and an expansion spring 17 is interposed between the collar and neck, which takes up the wear between the end of the cut-off and bottom plate, and thus prevents anything from working between them.

The rod upon which the gate 9 is pivoted, and to which it is also secured, extends beyond one side of the chute, and is bent to form a crank arm 18, to which is secured the lower, right angled end of an arm 19, the upper end of which is curved, and passes through an eye in the upper end of a rock arm 20, which is rigidly secured to the rod 14. The outer end of the arm 19 is threaded and receives a nut, between which and the end of the rock arm is interposed a strong, expansion cushion spring 21, and on the opposite side of the rock arm, and a short distance from it, a nut 22, is secured upon the arm, against which the rock arm strikes when the rod 14 is turned, thereby depressing the crank arm 18, and opening the gate 9.

Upon the rod 14, adjacent to the front of the casing, is secured a latch arm 23, to which is secured one end of a strong contraction spring 24, the opposite end of which is secured to the casing. This spring normally holds the gate 9 closed, by the pressure of the rock arm 20, against the cushion spring 21, by which the arm 19 and crank arm 18 are elevated.

Upon the inner side of the front of the casing is pivotally secured a catch arm 25, which lies at a slight angle to a horizontal plane, the upper end of which lies in the path of the latch arm 23, and is notched to form a hook or catch 26, which engages the latch in a manner to be presently explained. The lower end of the catch arm, is connected by a link 27 with the armature 27$^A$ of a magnet 28, which is secured to the casing.

A bracket 29 is secured to the front of the casing adjacent to one side, comprising a vertical member 30, which is secured to the casing, a rearwardly extending horizontal member 31, and two members 32 and 33 respectively, which depend from the horizontal member at right angles to each other and to the member 31. The member 32, extends below the member 33, and has a large opening 34 in its lower half, through which the end of a scale beam 35 extends. This beam is pivoted upon a standard 36, in the usual manner, and this standard extends up from one corner of the foundation frame 37 of the scale, which frame incloses the usual levers upon which the platform of the scale rests, and which are connected with the scale beam by a rod 38, in the usual manner.

A rock arm 39, is pivotally attached to the member 33 of the bracket 29, by a threaded stem 40, which projects at right angles from its lower end. This stem projects freely through an aperture in the said member, and upon it is screwed a spool 41, of fiber or other suitable non-conducting material around which in a circumferential recess of the spool is secured a metal band 42, one end of which projects a suitable distance beyond the spool, to form a terminal contact 43 of an electric circuit to be presently described. In an aperture in the horizontal portion 31 of the bracket, is a bushing 44, also of fiber or other suitable non-conducting material, having a hole through which a metal pin 45 passes, the lower end of which rests upon the metal band 42, and is held in contact therewith by a blade spring 46, one end of which exerts a downward pressure upon the pin, while the opposite end of the spring is secured by a screw 47 to a fiber block 48, the screw 47 also securing the end of a wire 49, which extends to one of the magnet spools. The upper end of the rock arm 39, is connected by a rod 50, with the latch arm 23, so that when the said arm is moved to engage the catch arm 25, the rock arm 39 will also be moved forward, which will turn the spool 41, and bring the terminal contact 43 in the path of the end of the scale beam, as shown in dotted lines (Fig. 4), which beam is provided at its extremity with a thin spring contact 51, which will engage the contact 43 to form an electric circuit, as will be presently shown. From the other spool of the magnet, a wire 52 extends to one of the poles of a battery 52$^A$, and from the other pole a wire 53 extends to the pivot 54 of the scale beam. Dry batteries are preferably employed and in the present instance three are shown, connected in the usual manner, and secured upon a shelf or support 55, which is attached to the frame below the hopper.

The platform 56 of the scale rests upon the scale levers in the usual manner, and an auxiliary platform 57, rests upon the platform 56, and is adapted to be raised above it so as to elevate smaller sacks or bags which are employed, and thus bring their mouths immediately below the discharge end of the chute, and this auxiliary platform is secured to the usual platform in the following manner: At each end of the main platform and upon its under side, is a depending post 58, and to each of these posts is secured one end of a lazy tong 59, the other ends of which are secured to right angled plates 60, secured to the under side of the auxiliary platform, a slot 61, being formed at each end of the main platform to accommodate these plates and the lazy tongs, and these slots are connected by a longitudinal slot 62, which permits the upward movement of an arm 63, which is secured at each end to the second pair of levers of the lazy tongs, and at the pivotal point of these levers. This arm extends up at an incline at each end from its connection with the lazy tongs, and merges into a horizontal portion which lies directly beneath the auxiliary platform when the same is down, or in its normal position, and from the center of the horizontal portion depends a post 64, which fits within a hub 65, upon the under side of the main platform. This hub is formed on one side, adjacent to the top, with ears 66, between which a pinion 67 is pivoted, which pinion engages teeth 68 on the post 64. The shaft 69 of the pinion extends out through one side of the main platform, and is provided with a notched hub 70, which is engaged by a pawl 71, and also with a crank handle 72, by which the shaft may be turned and cause the pinion to engage the teeth on the post 64, thus raising the arm 63, which opens the lazy tongs and elevates the auxiliary platform at a ratio of about four to one relatively to the movement of the arm. In order to steady the upward movement of the auxiliary platform, a downwardly extending arm 73, is secured at each end of the said platform, by the same rivets which secure the plates 60, and these arms lie against the outer sides of the lazy tongs, and are provided with slots 74, which extend from their lower ends to within a short distance of their upper ends, into each of which project one of the pivot pins 75 of the lazy tong sections, and as the platform moves up and down, the pins will also move up and down in the slots 74 and prevent wabbling of the platform.

The operation of the improved weighing machine is as follows: The hopper 2 is supplied with any suitable commodity such as sugar, rice, coffee, or the like, and in order to weigh out any desired amount of the commodity, the slide 76 on the scale beam, is moved to the number corresponding to the number of pounds required, a sack is placed upon the scale below the discharge end of the chute 8, and the operating lever 15, is moved in the direction of the arrow until the latch 23 is engaged by the catch arm 25; and simultaneously with this movement of the lever, the rod 14 is turned and the cut-off 12 uncovers the discharge aperture 7, while the rock arm 20 depresses the rod 19, which operates the crank arm 18 and opens the gate 9. The material then discharges into the sack, and the moment the scale beam tips its terminal contact 51 touches the contact 43, and an electric circuit is formed, through the said contact 43, the pin 45, blade spring 46, and wire 49, to the magnet; thence to the battery, through the wire 52, and from the battery to the scale beam, thus completing the circuit. The magnet is energized and its armature 27^A trips the catch arm 25, and releases the latch 23, which is withdrawn by the spring 24, thereby reversing the previous movements and closing the gate 9 and cut-off 12, and reversing the arm 39 to move the terminal 43 and open the circuit. The operating lever is limited in its backward movement by a stop 77, comprising a pin upon which a rubber buffer ring is mounted, which lessens the shock of the blow and the noise as well. In order that the scale beam may move only a slight distance in order to contact with the terminal 43, an adjusting screw 78 is passed up through the bottom of the member 32, of bracket 29, to form a rest for the beam, and by adjusting this screw, the beam may be raised to the required position relatively to the terminal 43. At the instant the circuit is formed and the supply is cut off from the hopper, the quantity of material in the sack corresponds to the exact weight required; consequently the material which leaves the chute at this instant and is in mid-air would constitute over-weight, and in order to provide for this, and secure the exact weight, the upper scale beam is provided with an additional or compensating slide 79, which can be so adjusted as to provide for the slight additional weight of the material in mid-air, when the cut-off is closed. The spring 21, forms a yielding abutment for the rock arm 20, and by exerting a constant pressure on the nut at the end of the rod 19, will take up all slack or wear between the rod and crank arm 18, and between the gate 9, and the bottom of the hopper, thus causing the gate to fit closely against the hopper and prevent the escape of material after the gate is closed.

Having described the invention, what we claim as new and desire to secure by Letters Patent, is:

1. In a weighing machine, the combination with a scale and a hopper arranged above the scale, of a chute leading from the hopper, having a cut-off at its upper end and a gate at its lower end; means for simultaneously opening said gate and cut-off; means for holding said gate and cut-off open; means connected with the scale beam for releasing said holding means when the beam is tipped, and a spring for restoring the parts to their normal positions.

2. In a weighing machine, a scale, a hopper located above said scale having an outlet at its lower end; a cut-off for controlling said outlet, a chute below said outlet having a gate at its lower end; means for simultaneously opening said gate and cut-off, and an electrically operated latch for holding them open, and means for making an electrical circuit when the scale beam is tipped, whereby to release the latch, and a spring for closing the gate and cut-off.

3. In a weighing machine, a scale, a hopper located above said scale, having a discharge outlet; a cut-off which normally closes said outlet; a chute below said outlet having a gate at its lower end; a manually operated rod for operating the cut-off; means connecting the rod and gate whereby the gate and cut-off are operated simultaneously; an electrically operated latch arm connected in circuit for holding said gate and cut-off open, terminal contacts for closing the circuit when the scale beam is tipped, whereby to release the latch, and a spring for closing the said gate and cut-off.

4. In a weighing machine, a scale, a hopper located above the scale having an outlet; a chute below said outlet having a gate at its discharge end; a cut-off to control the hopper outlet; a hand-operated rod for manipulating the cut-off; a crank arm on the gate, and means connecting the rod and crank arm whereby the gate and cut-off move simultaneously, a latch on said rod; an electrically operated catch arm in circuit for engaging said latch; a contact at one terminal of the circuit, and a contact on the scale beam, which engages the first contact when the beam is tipped to close the circuit and thereby release the latch, and a spring for restoring the parts to their normal positions.

5. In a weighing machine, a scale, a hopper located above the same having an outlet; a chute below the outlet having a gate at its lower end; a cut-off for the hopper outlet; an operating rod connected to the cut-off having a handle; a rock arm on said rod, a crank arm on said gate, and an arm connecting the crank arm and rock arm; a latch on the rod; a pivoted catch for engaging the latch when the gate and cut-off are open, a magnet and armature in a make and break circuit with said gate and cut-off in which said scale beam is included, and terminal contacts which close the circuit when the beam is tipped, thereby rocking the catch arm to release the latch, and a spring for restoring the latch, gate, and cut-off to their normal positions.

6. In a weighing machine, the combination with a scale, a hopper located above said scale having an outlet; a chute below said outlet having a gate at its lower end, and a cut-off for the hopper outlet, of means for opening said cut-off and gate simultaneously, a latch for holding them open for a predetermined period, a magnet and armature in a make and break circuit with said latch, means including contact terminals for closing the circuit when the scale beam is tipped, thereby energizing the magnet and releasing the latch, and a spring for closing the cut-off and gate.

7. In a weighing machine, the combination with a scale, a hopper above the scale having an outlet; a cut-off for the outlet; a chute below the outlet having a gate at its lower end, of means for opening said cut-off and gate simultaneously, a latch for holding them open, a magnet and armature in circuit with said latch; terminal contacts for closing the circuit when the beam is tipped, thereby energizing the magnet and releasing the latch, and a spring for closing the gate and cut-off.

8. In a weighing machine, a scale; a frame above said scale supporting a hopper; a bracket on said frame having an opening through which one end of the scale beam passes, a magnet in said frame in circuit with a battery; a terminal contact on the bracket, connected with the magnet, and a connection between the magnet, battery, and scale beam; a cut-off for the hopper; a chute below the cut-off having a gate at its lower end; an operating rod connected with the cut-off and with the gate whereby both are opened in unison; a latch on said rod; a pivoted catch for engaging the latch and holding the gate and cut-off open when the rod is turned, one end of which is connected to the magnet armature, the end of said beam when tipped being adapted to engage the terminal contact on the bracket, close the circuit, and release the catch, a spring for restoring the movable parts to their normal position, and means for shifting the contact to break the circuit.

9. In a weighing machine, a scale, a frame above the scale supporting a hopper, having an outlet in its bottom, a cut-off for the outlet, a chute below the outlet, a gate at the lower end of the chute; a rod extending from the cut-off through the frame and having an operating handle; a rock arm on the rod, a crank arm on the gate and an arm connecting the crank arm and rock arm; a bracket on the frame through which the forward end of the scale beam passes; a magnet in said frame in circuit with a battery; a terminal contact in said bracket secured upon a rock arm and insulated therefrom and from the bracket; a connection between said terminal contact and magnet, and from said magnet through the battery with the scale beam; a latch on the cut-off rod; a pivoted catch arm which engages said latch when the rod is turned, one end of which connects with the armature of the magnet, a terminal contact on the end of the scale beam which engages the contact on the bracket when the beam is tipped, thereby closing the circuit and releasing the latch by means of the armature; a spring for returning the parts to their normal position, and a rod connecting the rock arm to which one of the terminals is secured with the latch, whereby the circuit is broken when the latch is tripped.

10. In a weighing machine, the combination with a scale, a frame located above the scale, a hopper supported in the frame having an outlet; a cut-off for the outlet, and a chute below the outlet, having a gate at its lower end pivoted upon a crank arm; of means for opening said gate and cut-off simultaneously including a hand-operated rod secured to the cut-off and extending through the frame; a rock arm on the rod, an arm connecting said rock arm with the gate crank arm, and having a spring on its outer end which exerts a pressure against the rock arm, and an adjustable nut with which the rock arm abuts; an electric circuit in said frame including a battery and magnet, having a terminal contact adjacent to the end of the scale beam, said circuit including the beam; a latch on the rod; a catch arm pivoted to the frame having one end in the path of the latch and the other connected with the armature of the magnet, a spring for turning the rod and parts connected therewith to their normal position; a terminal contact on the end of the scale beam which engages the first-mentioned contact when the beam is tipped to close the circuit, and release the latch, and means for breaking the circuit when the latch is released.

11. In a weighing machine, the combination with a scale; a frame located above the scale, having a hopper provided with an outlet; a cut-off for the outlet; a chute below the outlet having a gate at its lower end; means for opening said gate and cut-off simultaneously; and means including a latch and catch arm for holding them open; of means for tripping said catch arm when the scale beam tips, comprising a bracket secured to the said frame, through which the end of the scale beam passes; an electric circuit including a magnet arranged in said frame having a terminal contact in said bracket adjacent to the end of the beam, but normally out of its path, and a contact on the end of said beam; means connected with the latch for moving the contact in the bracket, within the path of the beam contact to engage the same when the beam is tipped; a link connecting the latch arm and armature of the magnet, whereby the arm is tripped when the circuit is closed, and the latch released, and a spring for restoring the latch to its normal position.

12. In a weighing machine, the combination with a scale, a frame above said scale, a hopper in said frame having an outlet, a chute below the outlet having a gate at its lower end, a cut-off for the hopper outlet; a hand-operated rod connected with the cut-off and with the gate, a latch on said rod, and a pivoted catch arm, one end of which is in the path of the latch, of means for releasing the catch arm through the tipping of the scale beam when the required weight of material has discharged from the hopper, comprising a magnet the armature of which is connected with the catch arm, a battery in circuit with said magnet, a bracket on the frame through which the end of the scale beam passes; a rock arm pivoted to the bracket, and connected with the latch, a non-conducting element on said rock arm having a terminal contact thereon connected with the magnet; a connection between the battery and scale beam, and a spring for returning the latch, cut-off, and gate.

13. In a weighing machine, comprising a scale, a frame above the scale having a hopper with a discharge outlet, a cut-off for said outlet, a chute below the outlet having a gate in its lower end; means for opening the cut-off and gate in unison, and a latch for holding them open, and a magnet in an electric circuit, the armature of which is connected with the latch, said circuit including the scale beam; of a bracket on the frame through which the end of the scale beam passes; a rock arm pivotally secured to the bracket; a non-conducting spool on the rock arm; a spring contact on said spool; a pin engaging said contact; a spring which bears on the pin and which connects with the magnet; a spring for closing said gate and cut-off when the circuit is closed by the tipping of the scale beam, and means connecting the latch and rock arm, whereby the latter is turned to bring its contact in the path of the end of the scale beam when the gate and cut-off are open, and to turn it out of said path when the latch is tripped.

14. In a weighing machine, the combination with a scale, a hopper above the scale having a discharge outlet; a chute below the outlet, a cut-off for the outlet, and a gate in the lower end of the chute, of means for opening said gate and chute simultaneously, comprising a hand operated rod secured to the cut-off; a rock arm on the rod; a crank arm on the gate; a push arm connected at one end to the crank arm, the other end of which passes loosely through the end of the rock arm and has a nut on its outer end, a spring interposed between the rock arm and nut, and an abutment on the push arm adjacent to the opposite side of the rock arm; a latch mechanism for holding the gate and cut-off open, and means for automatically releasing the latch simultaneously with the tipping of the scale beam.

15. In a weighing machine, the combination with a scale, a hopper above the scale having an outlet; a chute below the outlet, a cut-off for the outlet, and a gate in the chute, means for opening the gate and cut-off simultaneously and a latch for holding them open; of means for tripping the latch, comprising a magnet, the armature of which is connected to the latch; a battery one pole of which connects with the magnet and the other with the scale beam; a movable terminal adjacent to the end of the scale beam connected with the magnet; a terminal on the end of the scale beam which acts in conjunction with the first-mentioned terminal to close the circuit and release the latch when the beam tips; means for shifting the movable terminal to break the circuit when the latch is tripped, and a spring for closing the gate and cut-off.

16. In a weighing machine, a scale, a frame above the scale having a hopper with an outlet, a chute below the outlet having a gate at its lower end and a cut-off for controlling the hopper outlet; means for opening the gate and cut-off simultaneously; a latch for holding them open; a bracket on the frame through which the forward end of the scale beam passes; an arm pivoted in the bracket having a fiber spool on its pivot stem; a metal band surrounding said spool, one end of which extends beyond the spool to form a terminal contact, a batter, and a magnet in circuit with the terminal and scale beam, and a contact on the end of the scale beam; a connection between the pivoted bracket arm and the latch, an adjusting screw in the bracket for varying the position of the scale beam relatively to the contact on the pivoted arm; means for connecting the latch with the armature of the magnet, and a spring for returning the movable parts to their normal position.

17. In a weighing machine, the combination with a scale, a hopper having an outlet; a chute below the outlet having a gate; a cut-off connected to said outlet; means for opening the cut-off and gate, a latch for holding them open, and means connected with the scale beam and latch for releasing said latch at a predetermined time; of an auxiliary platform for said scale, having lazy tong levers at each end connected with the main platform, an arm connecting the levers; a rack on said arm, a pinion in mesh with said rack, and means for turning the pinion to raise the arm and levers and elevate the platform.

18. In a weighing machine, the combination with a scale, of a hopper having a semicircular plate in its bottom, with a discharge opening; a semicircular cut-off plate over said opening, a chute below the opening having a gate across its lower end; a rod connected with the cut-off, a collar on said rod, and a spring interposed between the collar and the end of the hopper; a crank arm on the gate, a rock arm on the rod and an arm connecting the crank arm and rock arm; a handle on the rod for opening the gate and cut-off, a latch on the rod, a pivoted catch arm, one end of which is in the path of the latch, a magnet in an electric circuit; a link connecting the catch arm and the armature of the magnet, a terminal contact at the end of the scale beam for closing the circuit when the beam tips, thereby to trip the latch; means for breaking the circuit when the latch is tripped, a spring for returning the movable parts, and a buffer for receiving the blow of the returning handle.

In testimony whereof I affix my signature in presence of two witnesses.

CLINTON A. DOUGLASS.
FRED L. JONES.

Witnesses:
G. SARGENT ELLIOTT,
ADELLA M. FOWLE.